United States Patent
Qian et al.

(10) Patent No.: US 11,452,140 B2
(45) Date of Patent: Sep. 20, 2022

(54) RANDOM ACCESS METHOD, USER EQUIPMENT AND BASE STATION

(71) Applicant: Samsung Electronics Co., Ltd., Suwon-si (KR)

(72) Inventors: Chen Qian, Beijing (CN); Bin Yu, Beijing (CN); Qi Xiong, Beijing (CN); Feifei Sun, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/730,520

(22) Filed: Dec. 30, 2019

(65) Prior Publication Data

US 2020/0214044 A1 Jul. 2, 2020

(30) Foreign Application Priority Data

Dec. 29, 2018 (CN) .......................... 201811647305.6
Apr. 3, 2019 (CN) .......................... 201910265298.1

(51) Int. Cl.
*H04L 12/413* (2006.01)
*H04W 74/08* (2009.01)
*H04B 17/318* (2015.01)

(52) U.S. Cl.
CPC ...... *H04W 74/0833* (2013.01); *H04B 17/318* (2015.01)

(58) Field of Classification Search
CPC ......... H04W 74/0833; H04W 74/0866; H04W 74/0883; H04W 74/0891; H04W 74/00;

(Continued)

(56) References Cited

U.S. PATENT DOCUMENTS

2018/0139785 A1  5/2018  Zhang et al.
2018/0242367 A1*  8/2018  Kim .................... H04L 5/001
(Continued)

FOREIGN PATENT DOCUMENTS

EP    3629638 A1    4/2020
WO   2018086600 A1   5/2018
WO   2018127239 A1   7/2018

OTHER PUBLICATIONS

International Search Report in connection with International Application No. PCT/KR2019/018723 dated Apr. 8, 2020, 3 pages.

(Continued)

*Primary Examiner* — Huy C Ho

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a random access method, including: acquiring configuration information, transmitting a first message including a preamble and an uplink shared channel according to the configuration information, and receiving a second message including contention resolution information from a base station.

15 Claims, 12 Drawing Sheets

(58) Field of Classification Search
CPC ............. H04W 74/002; H04W 74/004; H04W 74/006; H04W 74/008; H04W 74/02; H04W 74/04; H04W 74/06; H04W 74/08
USPC ........................................ 370/462, 447, 461
See application file for complete search history.

(56) References Cited

U.S. PATENT DOCUMENTS

| | | | |
|---|---|---|---|
| 2018/0279375 A1* | 9/2018 | Jeon | H04W 74/0833 |
| 2018/0279376 A1 | 9/2018 | Dinan et al. | |
| 2019/0116613 A1* | 4/2019 | Abedini | H04W 74/02 |
| 2019/0357265 A1 | 11/2019 | Ren et al. | |

OTHER PUBLICATIONS

CATT, "Further considerations on a 2-step RA Procedure," R1-1700186, 3GPP TSG RAN WG1 AH_NR Meeting, Spokane, USA, Jan. 16-20, 2017, 4 pages.

ERICSSON, "NR two-step random access procedure," R1-1700300, 3GPP TSG-RAN WG1 NR adhoc, Spokane, USA, Jan. 16-20, 2017, 4 pages.

Interdigital, "2-Step RACH Procedure," R2-1814008, 3GPP TSG-RAN WG2 Meeting # 103bis, Chengdu, China, Oct. 8-12, 2018, 5 pages.

VIVO, "RAN2 impacts of 2-step RACH," R2-1818260 (Revision of R2-1814263), 3GPP TSG-RAN WG2 Meeting #104 Spokane, USA, Nov. 12-16, 2018, 5 pages.

Supplementary European Search Report dated Dec. 16, 2021, in connection with European Application No. 19902536.2, 13 pages.

Qualcomm Incorporated, "Report of Email Discussion [103#55] [NR-U] 2-step RACH Model and Initial Information Contents (Qualcomm)," R2-1815564, 3GPP TSG-RAN WG2 Meeting #103bis, Chengdu, China, Oct. 8-12, 2018, 17 pages.

VIVO, "Discussion on initial access for NR-U," R1-1810383, 3GPP TSG RAN WG1 Meeting #94bis, Chengdu, China, Oct. 8-12, 2018, 6 pages.

* cited by examiner

FIG. 5

| Cyclic Prefix 1 | Preamble | Cyclic Prefix 2 | Uplink Shared Channel | Guard Time |
|---|---|---|---|---|

FIG. 7

| Cyclic Prefix 1 | Preamble | Guard Time 1 | Cyclic Prefix 2 | Uplink Shared Channel | Guard Time 2 |

RANDOM ACCESS METHOD, USER EQUIPMENT AND BASE STATION

CROSS-REFERENCE TO RELATED APPLICATIONS

This application is based on and claims priority under 35 U.S.C. § 119 to Chinese Patent Application No. 201811647305.6 filed on Dec. 29, 2018 and Chinese Patent Application No. 201910265298.1 filed on Apr. 3, 2019 in the China National Intellectual Property Administration, the disclosures of which are herein incorporated by reference in their entirety.

BACKGROUND

1. Field

The present application relates to the field of wireless communications technologies, and in particular, to a random access method, a user equipment, and a base station.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with this, random access procedure is an important way for terminals to establish an access with base stations within a system.

SUMMARY

In view of this, embodiments of the present disclosure provide an optimized two-step random access procedure.

According to an aspect of the present disclosure, a random access method is provided, including: acquiring configuration information, transmitting a first message including a preamble and an uplink shared channel according to the configuration information, and receiving a second message including contention resolution information from a base station.

Transmitting the first message including the preamble and the uplink shared channel according to the configuration information comprises: determining a channel structure in the first message according to the configuration information, and transmitting the first message including the preamble and the uplink shared channel according to the determined channel structure, wherein the channel structure includes the preamble, the uplink shared channel, and a guard time.

In an embodiment, the method further comprises: acquiring a number of consecutive symbols, which are occupied by the preamble and the uplink shared channel, on one or more slots in the configuration information, the number of consecutive symbols being less than the maximum number of symbols on the one or more slots.

In an embodiment, the method further comprises: determining a starting time position of the uplink shared channel by one of the following:

acquiring a number of time units K from the configuration information, and using a position behind the K time units after the end of time units for a random access occasion as the starting time position for transmitting the uplink shared channel; or acquiring a time unit index according to the configuration information, and determining the starting time position for transmitting the uplink shared channel.

In an embodiment, the method further comprises: determining a length of the uplink shared channel by one of the following:

determining the length of the uplink shared channel according to a number of slots of the uplink shared channel and a number of symbols in the last slot; or determining the length of the uplink shared channel according to the number of slots of the uplink shared channel and a number of symbols of the uplink shared channel.

In an embodiment, the method further comprises: acquiring a repetition factor configured for the uplink shared channel, to transmit data on the uplink shared channel in a repetitive manner over a plurality of time units.

In an embodiment, the method further comprises: acquiring a frequency domain resource for the random access occasion occupied by the preamble and a frequency domain resource occupied by the uplink shared channel, and reserving a guard band between neighboring frequency domain resources for the uplink shared channel.

The reserved guard band is determined by one of the following:

determining the reserved guard band according to the frequency domain resource for the random access occasion, a starting index for frequency domain physical resource block of the uplink shared channel corresponding to the random access occasion and a bandwidth identified by a number of physical resource blocks; or determining the reserved guard band according to the first physical resource block index of the first uplink shared channel, the uplink shared channel bandwidth identified by the number of physical resource blocks, and a number of guard bands.

In an embodiment, the method further comprises: determining a waveform configuration of the uplink shared channel in the first message by one of the following:

acquiring the waveform configuration in the configuration information;

acquiring, in the configuration information, configuration information indicating whether a transform precoding is enabled or not;

determining whether the uplink shared channel enables the transform precoding using a field for configuring whether the transform precoding for a message 3 is enabled; or determining the waveform configuration or whether the transform precoding is enabled or not according to measurement results of the channel.

Acquiring the waveform configuration in the configuration information comprises: acquiring a field value indicating the waveform configuration in the configuration information; or acquiring an optional field defined to indicate the waveform configuration in the configuration information, and if the optional field is acquired, a waveform configuration represented by the optional field is employed, and if not, another waveform configuration different from the waveform configuration represented by the optional field is employed;

Acquiring, in the configuration information, configuration information indicating whether the transform precoding is enabled or not comprises: acquiring, in the configuration information, a field indicating whether the transformation precoding is enabled or not, and if the transformation precoding is enabled, a first waveform is employed, and if not, a second waveform is employed; or acquiring, in the configuration information, an optional field defined to indicate whether the transform precoding is enabled or not, and if the optional field is acquired, the first waveform is employed, and if not, the second waveform is employed.

Using the field for configuring whether the transform precoding for the message 3 is enabled or not comprises: acquiring, in the random access configuration information, a field for configuring whether the uplink shared channel carrying the message 3 enables the transform precoding.

Determining the waveform configuration or whether the transform precoding is enabled or not according to measurement results of the channel comprises: comparing a reference signal received power RSRP obtained by measuring a synchronization signal block with a first threshold, and if the RSRP is greater than the first threshold, the second waveform is employed or the transform precoding is not enabled, and if not, the first waveform is employed or the transform precoding is enabled; or comparing a path loss obtained by measuring or computing with a second threshold, and if the path loss is greater than the second threshold, the first waveform is employed or the transform precoding is enabled, and if not, the second waveform is employed or the transform precoding is not enabled.

In an embodiment, the method further comprises: acquiring associations between a first preamble group and a second preamble group of the first message and the waveform configuration of the uplink shared channel or whether the transform precoding is enabled or not.

In an embodiment, the method further comprises: acquiring associations between a first time-frequency resource and a second time-frequency resource for the uplink shared channel in the first message and the waveform configuration of the uplink shared channel or whether the transformation pre-coding is enabled or not.

In an embodiment, the method further comprises: acquiring associations between the first and second preamble groups of the first message, the first and the second time-frequency resources for the uplink shared channel in the first message and the waveform configuration of the uplink shared channel or whether the transform precoding is enabled or not.

In an embodiment, the method further comprises: determining a subcarrier spacing applied by the uplink shared channel in the first message by one of the following:

determining the subcarrier spacing applied by the uplink shared channel in the first message, according to subcarrier spacing configuration information applied to configure the uplink shared channel for message 3 transmission in the random access configuration information;

determining the subcarrier spacing applied by the uplink shared channel in the first message, according to subcarrier spacing configuration information applied to configure a common uplink bandwidth part in common uplink bandwidth part configuration information; or determining the subcarrier spacing applied by the uplink shared channel in the first message, according to subcarrier spacing configuration information applied to configure the additional uplink shared channel in the configuration information.

In an embodiment, the method further comprises: when generating data of the uplink shared channel, scrambling or bit-level interleaving the bit data, according to the time-frequency resource for transmitting the random access occasion and/or the time-frequency resource for the uplink shared channel and/or the preamble and/or demodulation reference signal information.

A data scrambling indication parameter that determines the way of scrambling the bit data is determined by one of the following:

determining the data scrambling indication parameter according to a time-frequency resource position of the random access occasion of the preamble in the first message;

determining the data scrambling indication parameter according to a time-frequency resource position of the uplink shared channel in the first message; or determining the data scrambling indication parameter according to the preamble in the first message.

Determining the data scrambling indication parameter according to the time-frequency resource position of the uplink shared channel in the first message further comprises: calculating, by using a port index of the demodulation reference signal, the data scrambling indication parameter.

Determining the data scrambling indication parameter according to the preamble in the first message comprises one of the following:

determining according to a selected preamble sequence index in the first message;

determining by the time-frequency resource position of the random access occasion and the preamble sequence index;

determining by the time-frequency resource position of the uplink shared channel and the preamble sequence index;

determining according to a port index of the demodulation reference signal of the uplink shared channel and the preamble sequence index;

determining according to a time-frequency position of the random access occasion and a time-frequency position of the uplink shared channel; or determining according to the time-frequency resource position of the random access occasion and the port index of the demodulation reference signal of the uplink shared channel.

In an embodiment, the method further comprises: determining a transmitted power of the uplink shared channel in the first message based on a sum of power rampups of a single physical resource block, wherein the sum of power rampups is a sum of power rampups achieved from the first attempt for transmitting first message to the current attempt for transmitting first message.

According to another aspect of the present disclosure, a random access method is provided, including: transmitting configuration information; receiving a first message including a preamble and an uplink shared channel, which is transmitted by a user equipment according to the configuration information; and transmitting a second message including contention resolution information to the user equipment.

The configuration information comprises information used to acquire a channel structure, the channel structure comprising the preamble, the uplink shared channel, and a guard time.

In an embodiment, the method further comprises: configuring a number of time units and/or a time unit index of the uplink shared channel in the configuration information.

In an embodiment, the method further comprises: configuring the number of slots of the uplink shared channel and the number of symbols in the last slot, or configuring the number of slots of the uplink shared channel and the number of symbols of the uplink shared channel.

In an embodiment, the method further comprises: configuring the repetition factor for the uplink shared channel.

In an embodiment, the method further comprises: configuring the frequency domain resource for the random access occasion occupied by the preamble and the frequency domain resource occupied by the uplink shared channel, and configuring the guard band reserved between neighboring frequency domain resources for the uplink shared channel.

Configuring the reserved guard band comprises:

configuring the frequency domain resource for the random access occasion, a starting index for frequency domain physical resource block of the uplink shared channel corresponding to the random access occasion and the bandwidth identified by the number of physical resource blocks; and configuring the first physical resource block index of the first uplink shared channel, the uplink shared channel bandwidth identified by the number of physical resource blocks, and the number of guard bands.

In an embodiment, the method further comprises: configuring the field or optional field indicating the waveform configuration in the configuration information; or configuring, in the configuration information, the field or optional field indicating whether the transform precoding is enabled or not.

In an embodiment, the method further comprises: dividing the preamble in the first message into a first preamble group and a second preamble group; and establishing associations between the first preamble group, the second preamble group and the waveform configuration of the uplink shared channel or whether the transform precoding is enabled or not.

In an embodiment, the method further comprises: dividing the time-frequency resource for the uplink shared channel in the first message into a first time-frequency resource and a second time-frequency resource; and establishing associations between the first time-frequency resource, the second time-frequency resource and the waveform configuration of the uplink shared channel or whether the transformation pre-coding is enabled or not.

In an embodiment, the method further comprises: dividing the preamble in the first message into a first preamble group and a second preamble group; dividing the time-frequency resource for the uplink shared channel in the first message into a first time-frequency resource and a second time-frequency resource; and establishing associations between the first and second preamble groups, the first and second time-frequency resources and the waveform configuration of the uplink shared channel or whether the transformation pre-coding is enabled or not.

In an embodiment, the method further comprises: configuring, in the configuration information, a parameter for characterizing the power difference between the preamble and the message 3 and a parameter for characterizing the power difference between the preamble in the first message and the uplink shared channel in the first message.

The configuration information includes the random access configuration information, the common uplink shared channel configuration information, or the default bandwidth part configuration information.

According to still another aspect of the present disclosure, there is also provided a user equipment comprising a processor and a memory, the memory storing computer executable code, when executed by the processor, performing the method as described in the embodiments of the present disclosure.

According to still another aspect of the present disclosure, there is also provided a base station device comprising a processor and a memory, the memory storing computer executable code, when executed by the processor, performing the method as described in the embodiments of the present disclosure.

According to still another aspect of the present disclosure, there is also provided a computer readable medium having stored thereon computer executable instructions, when executed by a processor, performing the method as described in embodiments of the present disclosure.

Embodiments of the present disclosure provide a two-step random access method for improving messaging. With the method provided by the embodiment of the present application, problems such as performance degradation caused by inter-symbol interference and inter-carrier interference in messaging in the two-step random access procedure can be alleviated.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 5 schematically illustrates a channel structure of a message A according to an embodiment of the present disclosure;

FIG. 7 schematically illustrates another channel structure of a message A according to an embodiment of the present disclosure;

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, some example embodiments of the present disclosure will be described in detail with reference to the accompanying drawings. It should be understood, however, that the description is only illustrative, and is not intended to limit the scope of the disclosure. In addition, descriptions of well-known structures and techniques are omitted in the following description in order to avoid unnecessarily obscuring the concept of the present disclosure.

All terms (including technical and scientific terms) used herein have the meaning commonly understood by those skilled in the art, unless otherwise defined. It should be noted that the terms used herein should be interpreted as having a meaning consistent with the context of the present specification and should not be interpreted in an ideal or too rigid manner.

Random access procedure is an important way for terminals to establish an access with base stations within a system. In 5G, it is divided into a contention-based random access procedure and a contention-free random access procedure, according to whether the same random access resource (including random access channel time-frequency resources and random access preamble resources) is shared by multiple terminals. The contention-based random access procedure is mainly applied in application scenarios including, for example but not limited to, initial access; when the terminal in a connected state is not synchronized in terms of uplink but has data to be transmitted in uplink; cell handover; or beam recovery from failure and the like. The contention-free random access process is mainly applied in application scenarios including, for example but not limited to, when the terminal in the connected state is not synchronized in terms of uplink and requires giving feedback in uplink as well as receiving downlink data; handover; system information request and the like.

Figure 1:
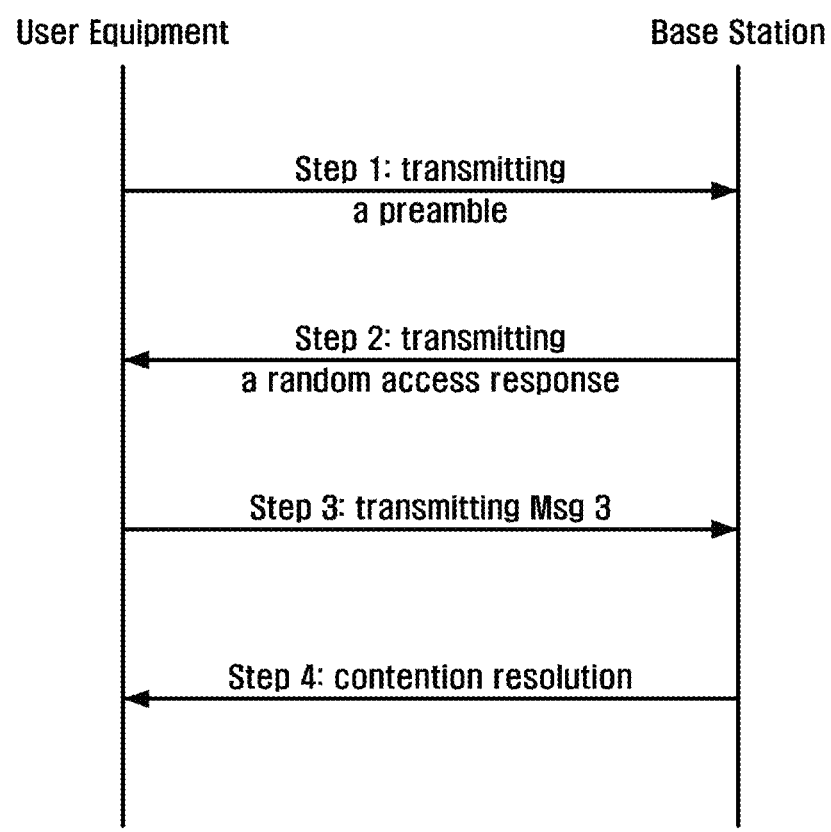
FIG. 1 schematically illustrates a schematic flow chart of a contention-based random access procedure.

The contention-based random access process supported by 5G consists of four steps, as shown in FIG. 1. In the first step, a user equipment randomly selects a preamble from a preamble sequence resource pool, and then sends the selected preamble to a base station. The base station performs correlation detection on the received signal to identify the preamble sent from the user equipment. In the second step, the base station sends to the user equipment a random access response (RAR) including a random access preamble identifier, a timing advance command determined according to a delay estimation between the user equipment and the base station, a temporary Cell-Radio Network Temporary Identity (C-RNTI), and time-frequency resources allocated for the next uplink transmission for the user equipment. In the third step, the user equipment sends a third message (Msg3) to the base station according to the information included in the RAR. The Msg3 includes information such as a user equipment terminal identity and a RRC link request. The user equipment terminal identity is unique to the user equipment and is applied to resolve a contention. In the fourth step, the base station sends a contention resolution identity to the user equipment, which includes the user equipment terminal identity of the user equipment that wins in the contention resolution. After detecting its own identity, the user equipment upgrades the temporary C-RNTI to a C-RNTI, and sends an acknowledgment (ACK) signal to the base station to complete the random access procedure and waits for scheduling of the base station. Otherwise, the user equipment will start a new random access procedure after a delay.

Figure 2:
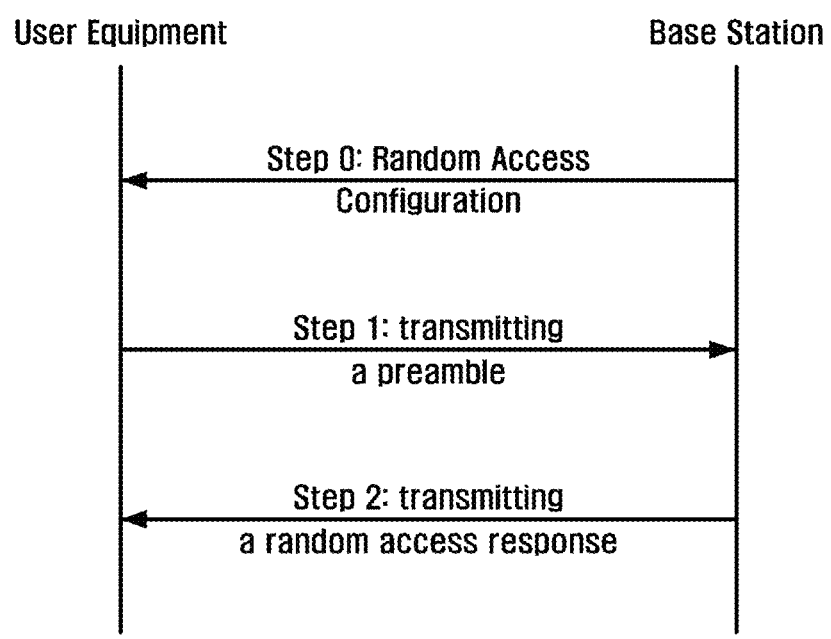
FIG. 2 schematically illustrates a schematic flow chart of a contention-free random access procedure.

The contention-free random access procedure is a simplification of the above four-step random access procedure, including two steps as shown in FIG. 2. The user equipment sends the preamble allocated by the base station over a random access occasion allocated by the base station, and detects the RAR within a detection window corresponding to the random access occasion. If the RAR detection is successful, the contention-free random access procedure is considered successful.

Figure 3:
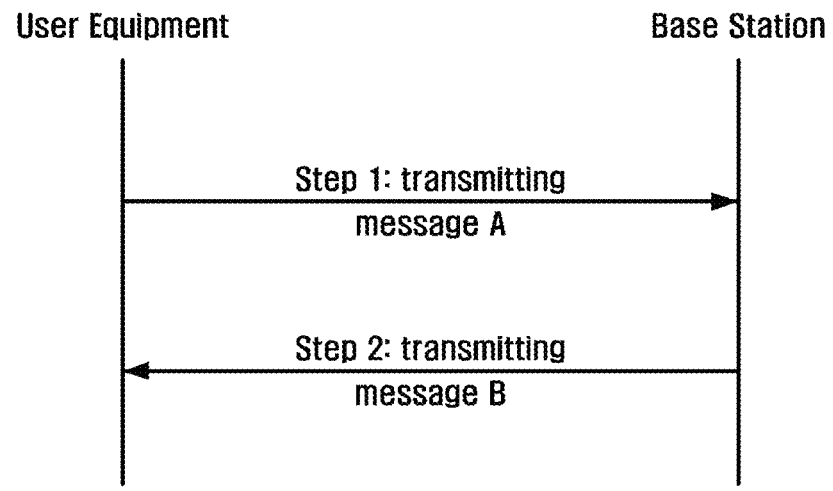
FIG. 3 schematically illustrates a two-step random access procedure according to an embodiment of the present disclosure.

In order to cope with a variety of application scenarios and wider application requirements supported by 5G, it is necessary to enhance the random access process supported by 5G. The two-step random access procedure is an effective enhancement of the random access procedure. In the two-step random access procedure, the user equipment first transmits the preamble and data on the time-frequency resource pre-configured or selected by the base station. The combination of the payload of data transmission and the preamble is referred to as message A (MSG. A). The data payload in the MSG.A includes at least the user equipment identity (for example, the Cell-Radio Network Temporary identity, the C-RNTI, allocated by the base station in a linked state, or the unique identity of the user equipment). If the base station successfully detects the transmission of the preamble and detects the user equipment identity included in the data payload, the base station performs feedback in the downlink channel, and the feedback data is referred as message B (MSG.B). MSG.B will contain contention resolution information to inform the user equipment of the contention resolution situation. FIG. 3 illustrates a schematic flow chart of the above two-step random access process.

Since the random access procedure supported by the 5G does not optimize the aforementioned two-step random access procedure, configurations of the existing random access procedure and configurations of the uplink shared channel are reused in the two-step random access procedure, which will cause a decrease in system efficiency. Therefore, it is necessary to further optimize the two-step random access process to improve the efficiency of the two-step random access process.

In a 5G system, the inventors have recognized that optimization for a two-step random access procedure can include the following possible aspects:

1. Channel structure: a structure of a preamble and an uplink shared channel carrying data, including a time-frequency resource structure, and content carried in the message A;

2. Procedure: including retransmission or reattempt of the message A, retransmission of message B, contention resolution mechanism, and corresponding procedures of the two-step random access procedure to fall back to the four-step contention-based random access procedure;

3. Signaling: including signaling for determining parameters, such as a Transmit Block Size (TBS) of the uplink shared channel for carrying data in the message A, a waveform, an association between time-frequency resources of the preamble and time-frequency resources of the uplink shared channel, and power control and the like.

The embodiments of the present disclosure mainly optimize the two-step random access procedure in terms of the channel structure and signaling aspects.

Figure 4:
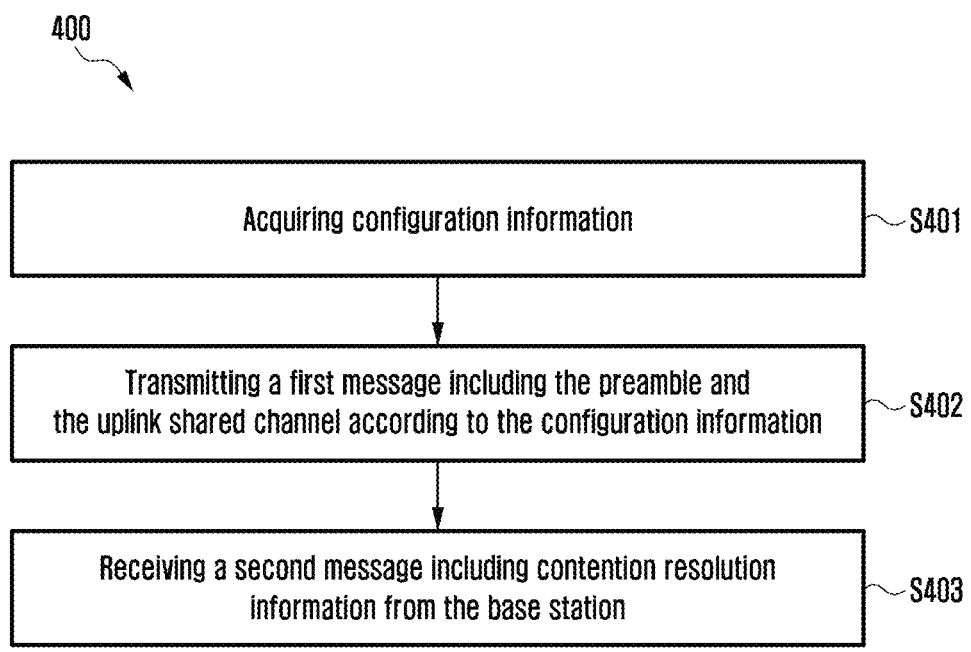
FIG. 4 schematically illustrates a schematic diagram of a random access method according to an embodiment of the present disclosure.
Figure 6:
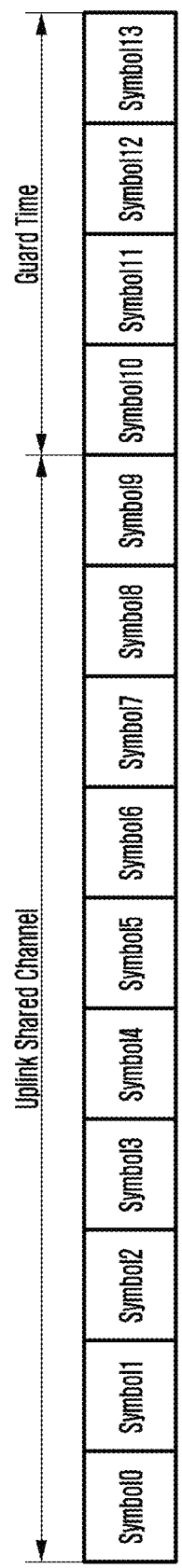
FIG. 6 schematically illustrates a schematic diagram of a configuration of a guard time according to an embodiment of the present disclosure.

FIG. 4 schematically illustrates a schematic diagram of a random access method 400 according to an embodiment of the present disclosure.

The random access method 400 is performed on user equipment side. The method includes: in step S401, acquiring configuration information; in step S402, transmitting a first message including the preamble and the uplink shared channel according to the configuration information; and in step S403, receiving a second message including contention resolution information from the base station.

The configuration information may be configuration information in system information sent by the base station to the user equipment.

In step S402, the user equipment may determine a channel structure in the first message according to the configuration information acquired in step S401, and transmit the first message including the preamble and the uplink shared channel according to the channel structure.

In one embodiment, the channel structure may include the preamble, the uplink shared channel, and the guard time.

The user equipment may acquire a number of consecutive symbols which are occupied by the preamble and the uplink shared channel, on one or more slots in the configuration information, the number of consecutive symbols being less than the maximum number of symbols on the one or more slots. The guard time in the channel structure may be determined based on the number of consecutive symbols and the maximum number of symbols.

A starting time position of the uplink shared channel may be determined in the following manners. For example, the user equipment may acquire the number of time units K from the configuration information, and use a position behind the K time units after the end of time units for a random access occasion as the starting time position for transmitting the uplink shared channel. Alternatively, for example, the user equipment may acquire a time unit index from the configuration information, and determine the starting time position for transmitting the uplink shared channel.

The length of the uplink shared channel may be determined in the following manners. For example, the length of the uplink shared channel may be determined according to the number of slots of the uplink shared channel and the number of symbols in the last slot. Alternatively, the length of the uplink shared channel may be determined according to the number of slots of the uplink shared channel and the number of symbols of the uplink shared channel.

The two-step random access procedure is introduced below in terms of the channel structure in combination with a specific system.

In this embodiment, the user equipment acquires the random access configuration information in the system information, including configuration information of the preamble applied by the message A shown in FIG. 3, and configuration information of the uplink shared channel in the message A.

The user equipment generates the preamble and the uplink shared channel according to the configuration information, and determines a transmitted power of the preamble and the uplink shared channel according to the power control parameter in the aforementioned configuration information, and performs transmission on the configured time-frequency resource.

The user equipment may perform transmission according to the configured or preset channel structure when transmitting the preamble and the uplink shared channel constituting the message A.

Considering that the base station receives messages A from the plurality of user equipments, it is necessary to estimate a timing advance by the preamble, and to use the estimated timing advance to attempt to detect data subsequently sent on the uplink shared channel. Since the time at which a signal sent by a different user equipment arrives at the base station is inconsistent, the base station, during detection, may suffer from a severe inter-symbol interference and thus an inter-carrier interference. Therefore, the design of the channel structure of the message A needs to take the possible inter-symbol interference and the inter-carrier interference into account to reduce the influence of interference on data demodulation by improving the channel structure.

Time Domain Configuration

In one embodiment, there is no guard time between the preamble and the uplink shared channel. When the user equipment sends the message A including the preamble and the data payload, a possible channel structure for sending is that the message A sequentially includes a cyclic prefix 1, the preamble, a cyclic prefix 2, the uplink shared channel, and the guard time. In this configuration, there is no guard time between the preamble and the uplink shared channel. It should be noted that the preamble may contain multiple consecutive symbols, each symbol having a separate cyclic prefix, and the length of the cyclic prefix for each symbol being the same as the cyclic prefix 1; the uplink shared channel may contain multiple consecutive symbols, each symbol having a separate cyclic prefix, and the length of the cyclic prefix for each symbol being the same as the cyclic prefix 2. FIG. 4 illustrates the possible channel structure of the message A.

When the above structure is employed, the user equipment determines the number of symbols in preamble and the length of the cyclic prefix 1 according to the preamble format in the random access configuration; the user equipment selects a starting symbol position for the preamble transmission according to configuration of the random access occasion, the selected synchronization signal block, and the association between the synchronization signal block and the random access occasion; the user equipment determines the number of symbols for the uplink shared channel according to the number of symbols of the uplink shared channel of the message A in the random access configuration; the user equipment determines the length of the cyclic prefix 2 according to configuration in the system information.

In this configuration, the guard length may be determined in an implicit manner without additional configuration information. Specifically, the preamble and the uplink shared channel in the message A occupy multiple consecutive symbols on one or more slots. If the preamble and the uplink shared channel in the message A do not occupy all the symbols, the unoccupied symbols are used as the guard time, as the schematic diagram of configuration of the guard time illustrated in FIG. 6.

In another embodiment, the guard time is provided between the preamble and the uplink shared channel. To ensure that the symbol boundary between the preamble symbol and the uplink shared channel symbol in the message A is aligned with the symbol boundary of the transmission of other channels, and that the interference between symbols of the preamble and symbols of the uplink shared channel is reduced, a guard spacing is added according to the preamble format when transmitting the preamble symbols. In this channel structure, the message A may sequentially include: the cyclic prefix 1, the preamble, the guard time 1, the cyclic prefix 2, the uplink shared channel, and the guard time 2, as another possible channel structure of the message A illustrated in FIG. 7.

It should be noted that the preamble may contain multiple consecutive symbols; each symbol includes a separate cyclic prefix, and the length of the cyclic prefix for each symbol is the same as the cyclic prefix 1. The uplink shared channel may contain multiple consecutive symbols; each symbol includes a separate cyclic prefix, and the length of the cyclic prefix for each symbol is the same as the cyclic prefix 2.

When such channel structure is employed, the number of symbols of the preamble and the length of the cyclic prefix 1 are determined by the preamble format in the random access configuration; and the time and frequency domain positions of symbols of the preamble are determined by configuration information of the random access channel.

The user equipment may determine the starting time position of the uplink shared channel as follows:

a. The base station configures and notifies the starting time position of the uplink shared channel in a relative manner for the user equipment to acquire. Specifically, the user equipment acquires the number K1 of time units configured in the system information, and starts transmitting the uplink shared channel at a time unit behind the K1 time units after the end of time units for the random access occasion. The time unit may comprise a symbol, or a slot, or a mini slot. The number of time units K1 may be included in the random access configuration information, may also be included in a common uplink shared channel configuration, and may also be added in default bandwidth part configuration.

b. The base station configures and notifies the starting time position of the uplink shared channel in an absolute manner for the user equipment to acquire. For example, the user equipment may acquire the time unit index configured in the system information to determine the starting time position for transmitting the uplink shared channel. The time unit may comprise a symbol, a slot, or a mini slot. The time unit index may be included in the random access configuration information, may also be included in the common uplink shared channel configuration, and may also be added in the default bandwidth part configuration.

The user equipment may determine the time length of the uplink shared channel and the length of the guard time 2 as follows:

a. The base station directly configures and notifies the number of time units of the uplink shared channel. The time unit may comprise a symbol, a slot, or a mini slot. The configuration information may be included in the random access configuration information, may also be included in the common uplink shared channel configuration, and may also be added in the default bandwidth part configuration.

b. The time length of the uplink shared channel and the length of the guard time 2 may be determined according to the number of slots of the uplink shared channel and the number of symbols in the last slot configured by the base station. If the number of symbols in the last slot is less than the maximum number of symbols in one slot, the remaining symbols are used as the guard time. The configuration may be included in the random access configuration information, may also be included in the common uplink shared channel configuration, and may also be added in the default bandwidth part configuration.

c. The time length of the uplink shared channel and the length of the guard time 2 may be determined according to the number of slots of the uplink shared channel and the number of symbols of the uplink shared channel configurated by the base station. If the number of symbols of the uplink shared channel is less than the product of the number of slots of the uplink shared channel and the maximum number of symbols in one slot, the difference therebetween is used as the guard time. The configuration may be included in the random access configuration information, may also be included in the common uplink shared channel configuration, and may also be added in the default bandwidth part configuration.

When the channel structure is employed, the guard time between the preamble and the uplink shared channel is able to protect the symbols of the preamble from the inter-symbol interference and the inter-carrier interference caused by subsequent symbols of the uplink shared channel due to different arrival times of signals sent by different user equipment, and is able to protect the uplink shared channel from the inter-symbol interferences and the inter-carrier interferences caused by the symbols of the preamble.

Furthermore, this configuration enables the base station a more flexible scheduling if the guard time 1 is long enough. For example, if the base station does not detect the transmission of the preamble on the random access occasion of the message A, the base station may schedule the time-frequency resources of the uplink shared channel corresponding to the random access occasion to other user equipments. In this case, the guard time 1 needs to be long enough, and one possible example is that the guard time 1 is 1 slot.

On the basis of the above two basic structures, the user equipment may also acquire a repetition factor configured for the uplink shared channel, to transmit data on the uplink shared channel in a repetitive manner on a plurality of time units. Specifically, for example, a repetition structure may be introduced into the uplink shared channel, that is, the repetition factor $K_{rep}$ is configured to transmit data in the repetitive manner on a plurality of time units. The time unit can be a slot, a symbol, a mini slot, or the like. The repetition factor may be configured in the random access configuration information, or in the common uplink shared channel configuration, or in the default bandwidth part configuration.

Figure 8:
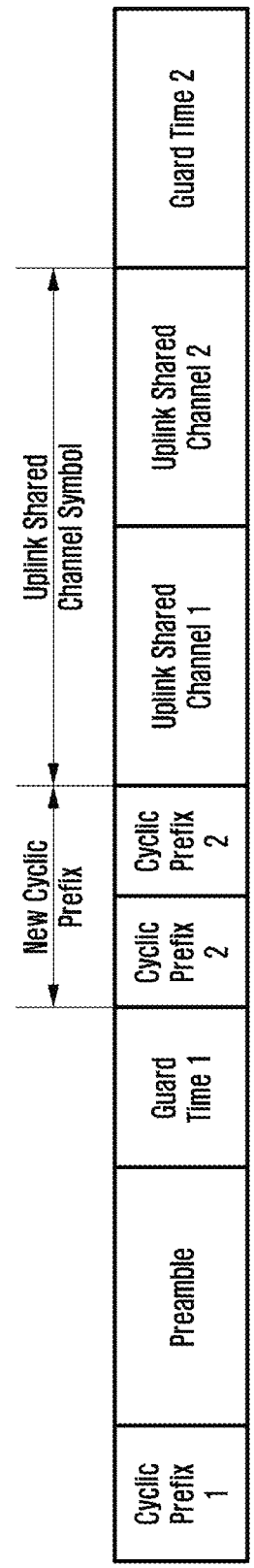
FIG. 8 schematically illustrates still another channel structure of a message A according to an embodiment of the present disclosure.

In another possible repetition structure, $K_{rep}$ symbols are grouped together to change the lengths of the cyclic prefix and the symbol. For example, the length of the cyclic prefixes becomes a sum of lengths of $K_{rep}$ original cyclic prefixes, and the length of symbols is a sum of lengths of $K_{rep}$ original symbols. The new symbol may be transmitted in the repetitive manner, or the data may be transmitted in a reducing code rate, such as another possible channel structure of the message A as shown in FIG. 8.

Frequency Domain Configuration

In this embodiment, the user equipment may acquire a frequency domain resource for the random access occasion occupied by the preamble and a frequency domain resource occupied by the uplink shared channel, and may reserve a guard band between neighboring frequency domain resources for the uplink shared channel.

The reserved guard band may be determined as follows. In an embodiment, the user equipment may determine the reserved guard band according to the frequency domain resource for the random access occasion, the starting index for frequency domain physical resource block of the uplink shared channel corresponding to the random access occasion, and the bandwidth identified by the number of physical resource blocks. Alternatively, the user equipment may determine the reserved guard band according to the first physical resource block index of the first uplink shared channel, the uplink shared channel bandwidth identified by the number of physical resource blocks, and the number of guard bands.

Specifically, for the frequency domain resource of the message A, the base station may jointly configure or separately configure the frequency domain resource for the random access occasion occupied by the preamble and the frequency domain resource occupied by the uplink shared channel.

For the later case (i.e., separately configuring), frequency domain resources used for the random access occasion may be determined according to the random access channel configuration, and frequency domain resources applied by the uplink shared channel may be determined according to the configuration in the system information, and an association between the uplink shared channel and the random access occasion and/or the preamble may be established.

Figure 9:
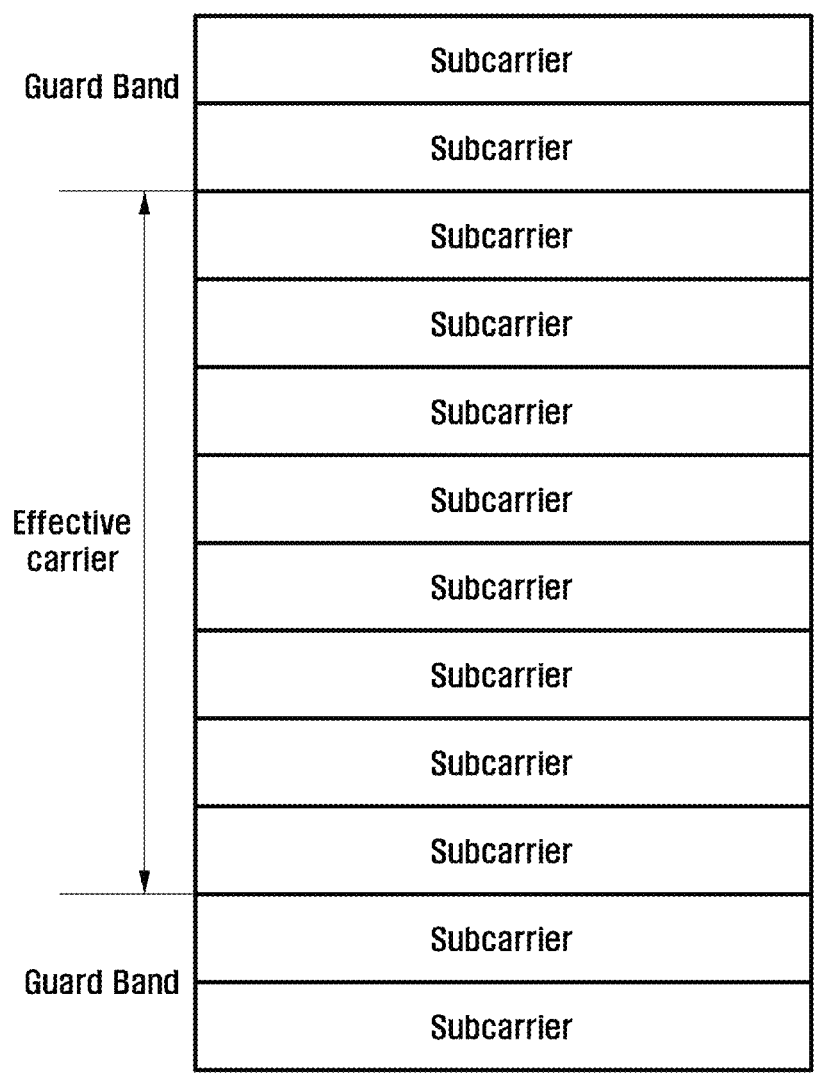
FIG. 9 schematically illustrates a schematic diagram of a guard band which is a subcarrier according to an embodiment of the present disclosure.

For the frequency domain resource of the uplink shared channel, the guard band needs to be reserved between neighboring frequency domain resources to reduce inter-carrier interference caused by different user equipment timing sequences. A possible configuration manner is that when the base station configures the frequency domain resource for the random access occasion, the base station simultaneously configures the starting index for frequency domain physical resource block of the uplink shared channel corresponding to the random access occasion and the bandwidth identified by the number of physical resource blocks, as illustrated in FIG. 9. In this way, the guard bandwidth between different uplink shared channels may be configured in an implicit manner.

In another possible manner, the base station configures the first physical resource block index of the first uplink shared channel, the uplink shared channel bandwidth identified by the number of physical resource blocks, and the number of guard bands. In this manner, the number of guard bands may be an integer number of physical resource blocks, or may be the number of subcarriers.

For the case where the guard bandwidth is multiple subcarriers, after acquiring the configuration information, the user equipment reserves the configured number of subcarriers at the edge of the uplink shared channel (for example, the case where guard band is the subcarrier is shown in FIG. 9).

For the case where the frequency domain resource for the random access occasion and the frequency domain resource of the uplink shared channel are jointly configured, the aforementioned manner for configuring the uplink shared channel can still be applied.

The random access method will be introduced below for the uplink shared channel.

In this embodiment, the user equipment first acquires the random access configuration information from the configuration information of the system information, wherein the random access configuration information may include the configuration information of the random access channel, the configuration information of the preamble, and the resource configuration information of the uplink shared channel for transmitting the data payload in the message A. The system information may be Remaining Minimum System Information (RMSI), or a Master Information Block (MIB), or information carried by a System Information Block (SIB).

When the user equipment acquires the random access configuration information, in addition to acquiring the configuration information of the preamble and the random access occasion, the user equipment also acquires the configuration information of the uplink shared channel for sending the data payload in the message A, such as the time-frequency resource information and the waveform configuration applied, Sub-carrier Spacing (SCS) configuration information, and the like.

Acquiring the waveform configuration of the uplink shared channel for transmitting the data payload in the message A may be performed in the following manners:

a. Corresponding waveform configuration may be acquired in the configuration information.

For example, a corresponding field may be acquired from the configuration, and then the waveform configuration of the uplink shared channel may be acquired by assignment of the value of the field. One possible way is to acquire the field in the configuration information, which may be assigned with a first waveform (e.g., DFT-s-OFDM) or a second waveform (e.g., OFDM). That is, the following fields may be defined in the configuration information:

$WF\_MSGA$=ENUMERATED{$OFDM,DFT$-$s$-$OFDM$}

Where WF_MSGA is a field for configuring the waveform of the uplink shared channel in the configuration information, and ENUMERATED{ } indicates an enumeration, that is, the field can be assigned a value selected from the ones defined in the parentheses. If the WF_MSGA is configured with, for example, OFDM, OFDM will be applied by the uplink shared channel in the message A; if the WF_MSGA is configured with, for example, DFT-s-OFDM, DFT-s-OFDM will be applied by the uplink shared channel in the message A. The user equipment acquires the waveform of the uplink shared channel according to the field WF_MSGA in the configuration information.

Another possible way is that an optional field such as DFT enabled may be defined in the configuration information. This field may be assigned a value of {enabled}. If the field is not acquired by the user equipment in the configuration information (that is, the optional field is not included in the configuration information, or the optional field is invalid in the configuration information), a default waveform, such as OFDM, will be applied by the uplink shared channel for carrying the data payload in the message A. If the field is acquired by the user equipment in the system information, the DFT-s-OFDM will be applied by the uplink shared channel carrying the data payload in the message A.

Similarly, an optional field such as OFDM enabled may be defined in the configuration information. This field may be assigned a value of {enabled}. If the field is not acquired by the user equipment in the system information (that is, the optional field is not included in the system information, or the optional field is invalid in the system information), a default waveform, such as DFT-s-OFDM, will be applied by the uplink shared channel for carrying the data payload in the message A. If the field is acquired by the user equipment in the system information, OFDM will be applied by the uplink shared channel carrying the data payload in the message A.

It should be noted that the aforementioned field defined in the configuration information may be added in the random access configuration information, in the common uplink shared channel configuration, and also in the default bandwidth part configuration.

b. Configuration information indicating whether a transform precoding is enabled or not may be acquired in the configuration information.

For example, the corresponding field may be acquired in the configuration information, and then according to the value of the field, whether the transform precoding is enabled or not may be determined. It should be noted that if the transform precoding is not enabled, the second waveform (such as an OFDM waveform) will be applied by the uplink shared channel part of the message A; if the transform precoding is enabled, the first waveform (such as a DFT-s-OFDM waveform) will be applied by the uplink shared channel part of the message A employs.

One possible way is to acquire fields in the configuration information, which may be assigned a value of {enabled} or {disabled}. That is, a field such as msgATransformPrecoder may be defined in the configuration information, which is applied to configure the waveform for the uplink shared channel in the message A, and is assigned a value of {enabled} or {disabled}. When the user equipment acquires the configuration information, whether the transform precoding is applied by the uplink shared channel in the message A may be determined according to the value of the field.

Another possible way is that an optional field such as msgATransformPrecoder may be defined in the configuration information. This field may be assigned a value of {enabled}. If the field is not acquired by the user equipment in the configuration information (that is, the optional field is not included in the configuration information, or the optional field is invalid in the configuration information), the transform precoding will not be applied by the uplink shared channel for carrying the data payload in the message A, that is, the second waveform such as OFDM will be applied. If the field is acquired by the user equipment in the configuration information, the transform precoding will be applied by the uplink shared channel carrying the data payload in the message A, that is, the first waveform such as DFT-s-OFDM will be applied.

It should be noted that the aforementioned field defined in the configuration information may be added in the random access configuration information, in the common uplink shared channel configuration, and also in the default bandwidth part configuration.

c. A field for configuring whether the transform precoding for a message 3 is enabled or not, is applied to determine whether the uplink shared channel in the message A enables the transform precoding or not.

For example, the user equipment may acquire the random access configuration information, if a msg3-transformPrecoding field for configuring whether the uplink shared channel carrying a message 3 enables the transform precoding or not is acquired from the random access configuration information with a value of {enabled}, the transform precoding will be applied by the uplink shared channel in the message A, that is, the DFT-s-OFDM will be applied. If the field is not acquired by the user equipment in the random access configuration information, or the field is acquired with a value {disabled}, the transform precoding will not be applied by the uplink shared channel in the message A, that is, the OFDM waveform will be applied.

c.1. The UE first determines whether the resource configuration information for the four-step random access is configured in an activated uplink bandwidth part (BWP) (or carrier) allocated for the UE (i.e., whether the subcarrier spacing or the waveform/transform precoding for the message 3 is configured). The activated uplink BWP (or carrier) may be an initial activated uplink BWP (or carrier), or may be an activated uplink BWP (or carrier) configured by the network after the UE enters the connection state. The determination may be performed as follows:

The UE may perform the determination according to the PUSCH (Physical Uplink Shared Channel) subcarrier spacing configuration or the waveform configuration separately configured in the resource configuration for the two-step random access, or may perform the determination according to the subcarrier spacing configuration or the waveform configuration in the configuration for the activated uplink BWP (or carrier), when the resource configuration information for the four-step random access is not contained in the activated uplink BWP (or carrier) (i.e., the subcarrier spacing configuration or the waveform configuration for the message 3 is not contained), and/or the resource configuration information for the two-step random access is contained in the activated uplink BWP (or carrier) (i.e., the subcarrier spacing configuration or the waveform configuration for the PUSCH for two-step random access is contained);

The UE may perform the determination by determining the subcarrier spacing configuration or the waveform configuration for the PUSCH for the two-step random access according to the subcarrier spacing configuration or the waveform configuration for the message 3 (in this case, the UE ignores the subcarrier spacing configuration or waveform configuration, if any, separately configured for the PUSCH for the two-step random access), or may perform the determination according to the subcarrier spacing configuration or the waveform configuration for the activated uplink BWP (or carrier), when the resource configuration information for the four-step random access is contained in the activated uplink BWP (or carrier) (i.e., the subcarrier spacing configuration or the waveform configuration for the message 3 is contained), and/or the resource configuration information for the two-step random access is contained in the activated uplink BWP (or carrier) (i.e., the subcarrier spacing configuration or the waveform configuration for the PUSCH for the two-step random access is contained).

As described above, the resource configuration information for the two-step random access includes the configuration information of the preamble, the resource configuration information of the random access occasion, the subcarrier spacing configuration and the waveform configuration for the PUSCH for the message A. Alternatively, instead of the waveform configuration, the transform precoding configuration may be used. The resource configuration information for the four-step random access includes the configuration information of the preamble for the four-step random access, the resource configuration information of the random access occasion, the subcarrier spacing configuration and the waveform configuration for the PUSCH for the message 3. Alternatively, instead of the waveform configuration, the transform precoding configuration may be used.

Some special cases of the above approach are provided:

If the resources for the two-step random access and the resources for the four-step random access are configured on the activated uplink BWP, and the resource configuration information for the two-step random access includes the configuration information of the subcarrier spacing configuration and the waveform (the transform precoding) configuration for the PUSCH for the message A, the subcarrier spacing configuration and the waveform (the transform precoding) configuration for the PUSCH for the message A may be determined based on the resource configuration information for the two-step random access;

If the resource configuration information for the two-step random access does not include the subcarrier spacing configuration and the waveform (the transform precoding) configuration for the PUSCH for the message A, and the resource configuration information for the four-step random access includes the subcarrier spacing configuration and the waveform (the transform precoding) configuration for the PUSCH for the message 3, the subcarrier spacing configuration and the waveform (the transform precoding) configuration for the PUSCH for the message A may be determined according to the subcarrier spacing configuration and the waveform (the transform precoding) configuration for the PUSCH for the message 3;

If the subcarrier spacing configuration and the waveform (the transform precoding) configuration for the PUSCH are not included in the resource configuration information for the two-step random access and the resource configuration information for the four-step random access, the subcarrier spacing configuration and the waveform (the transform precoding) configuration for the PUSCH for the message A may be determined according to the subcarrier spacing configuration and the waveform (the transform precoding) configuration for the PUSCH for the activated uplink BWP.

d. The user equipment may determine the waveform applied or whether the transform precoding is enabled or not according to some measurement results of the channel.

One possible way is that the user equipment may select a synchronization signal block according to the measurement result of the synchronization signal block. At the same time, the user equipment compares a reference signal received power (RSRP) obtained by measuring the synchronization signal block with a pre-configured or predefined first threshold. If the RSRP is greater than the first threshold, the second waveform such as OFDM will be applied, or the transform precoding will not be enabled; otherwise, if the RSRP is less than the first threshold, the first waveform, such as DFT-s-OFDM, will be applied, or the transform precoding will be enabled. The RSRP may be obtained by measuring a Primary Synchronous Signal (PSS) or a Secondary Synchronous Signal (SSS), or a demodulation reference signal in a broadcast channel.

Another possible way is that the user equipment may compare a path loss obtained by measuring and/or computing with a preset or pre-acquired second threshold. If the path loss is greater than the second threshold, the first waveform, such as DFT-s-OFDM, will be applied as the waveform of the uplink shared channel in the message A, or the user equipment will enable the transform precoding when the uplink shared channel in the message A is generated. Otherwise, if the path loss is less than the second threshold, the second waveform, such as OFDM, will be applied as the waveform of the uplink shared channel in the message A, or the user equipment will not enable the transform precoding when the uplink shared channel in the message A is generated.

The user equipment may acquire the aforementioned parameters as follows: for example, the user equipment may acquire the RSRP by measuring the synchronization signal block, acquire the transmitted power of the base station in the configuration information, and acquire the path loss by computing the transmitted power of the base station and the RSRP.

It should be noted that the aforementioned first threshold and the second threshold may be configured and notified by the base station in the configuration information, that is, the user equipment acquires the aforementioned first threshold or the second threshold by acquiring the configuration information. It may also be configured in a preset manner. The system information may be the random access configuration information, the common uplink shared channel configuration, or the default bandwidth part configuration information.

If the aforementioned method (i.e., the manner d) of determining the waveform of uplink shared channel in the message A according to the measurement result is applied, the reliability and effectiveness of the base station detecting the message A may be improved as follows. Possible approaches may include:

d.1 The base station may divide the preambles usable for transmission of the message A into two groups (for example, a first preamble group and a second preamble group), and establish associations between the first and second preamble groups and the waveform used for the uplink shared channel in the message A, respectively, or establish associations between the first and the second preamble groups and whether the transform precoding is enabled or not, respectively. Correspondingly, the user equipment may acquire associations between the first preamble group and the second preamble group of the first message and the waveform configuration of the uplink shared channel or whether the transform precoding is enabled or not.

For example, the first preamble group corresponds to that OFMD is applied by the uplink shared channel or that the transform precoding is not enabled; the second preamble group corresponds to that DFT-s-OFDM is applied by the uplink shared channel or that the transform precoding is enabled. If the user equipment selects OFDM or not to enable the transform precoding according to the measurement result, the user equipment selects a preamble in the first preamble group as the preamble in the message A; if the user equipment selects DFT-s-OFDM or to enable transform precoding according to the measurement result, the user equipment selects a preamble in the second preamble group as the preamble in message A. The preamble group information is configured and notified in the random access configuration information.

d.2 The base station divides the time-frequency resources that can be used for the message A to send the uplink shared channel into two groups (for example, a first time-frequency resource and a second time-frequency resource), and establishes associations between the first and second time-frequency resources and the waveform applied by the uplink shared channel in the message A, respectively, or establishes associations between the first and second time-frequency resources and whether the transform precoding is enabled or not, respectively. Correspondingly, the user equipment may obtain associations between the first time-frequency resource and the second time-frequency resource for the uplink shared channel in the first message and the waveform configuration of the uplink shared channel or whether the transformation pre-coding is enabled or not.

For example, the first time-frequency resource corresponds to that OFMD is applied by the uplink shared channel or that the transform precoding is not enabled; the second time-frequency resource corresponds to that DFT-s-OFDM is applied by the uplink shared channel or that the transform precoding is enabled. The time-frequency resource group information is configured and notified in the random access configuration information, or in the common uplink shared channel configuration, or in the default bandwidth part configuration.

d.3 the aforementioned two approaches are combined, that is, simultaneously grouping the preamble and the time-frequency resources of the uplink shared channel, establishing associations between the respective groups and the waveform applied by the uplink shared channel in the message A, or establishing associations between the respective groups and whether the transform precoding is enabled or not. Correspondingly, the user equipment may obtain associations between the first preamble group and the second preamble group of the first message, the first and the second time-frequency resources for the uplink shared channel in the first message and the waveform configuration of the uplink shared channel or whether the transform precoding is enabled or not.

For example, the first preamble group and the first time-frequency resource correspond to that OFMD is applied by the uplink shared channel or that the transform precoding is not enabled; the second preamble group and the second time-frequency resource correspond to that DFT-s-OFDM is applied by the uplink shared channel or that the transform precoding is enabled. The aforementioned grouping information may be configured and notified in the system information. For example, the preamble group information and the time-frequency resource group configuration information of the uplink shared channel in the message A are configured and notified in the random access configuration information; alternatively, the preamble group information is configured and notified in the random access configuration information, and the time-frequency resource group configuration information of the uplink shared channel in the message A is configured and notified in the common uplink shared channel configuration or the default bandwidth part configuration information.

A subcarrier spacing applied by the uplink shared channel in the message A may be determined as follows.

a. The subcarrier spacing applied by the uplink shared channel in the message A is determined by using subcarrier spacing configuration information applied to configure the uplink shared channel transmitting the message 3 in the random access configuration.

Specifically, the user equipment acquires the subcarrier spacing configuration information applied to configure the uplink shared channel transmitting the message 3 in the random access configuration, in order to determine the subcarrier spacing applied by the uplink shares channel in the massage A.

b. The subcarrier spacing applied by the uplink shared channel in the message A is determined according to subcarrier spacing information applied to configure a common uplink bandwidth part in common uplink bandwidth part configuration information.

Specifically, when the user equipment acquires the configuration information, the user equipment obtains common uplink bandwidth part configuration information, and obtains the subcarrier spacing configuration for the common uplink bandwidth part, to determine the subcarrier spacing applied by the uplink shared channel in the message A.

c. The subcarrier spacing is determined according to information applied to configure the subcarrier spacing for the uplink shared channel in the message A, in the configuration information.

Specifically, the configuration information for configuring the subcarrier spacing for the uplink shared channel in the message A is added to the configuration information of the system information, and the user equipment then determines the subcarrier spacing according to the added configuration information. The configuration information may be added in the random access configuration information, or in the common uplink shared channel configuration or in the common uplink bandwidth part configuration information.

The user equipment acquires the configuration information in the system information, acquires the random access configuration information, obtains the configuration of the preamble and the time-frequency configuration of the uplink shared channel in the message A, and according to the aforementioned manners, obtains the waveform and the subcarrier spacing applied by the uplink shared channel in the message A, generates the message A, and transmits the preamble and the uplink shared channel on the aforementioned configured time-frequency resources.

Hereinafter, the random access method will be described in combination with scrambling.

In this embodiment, the user equipment acquires the random access configuration information in the system information, including the configuration information of the preamble applied by the message A, and the configuration information of the uplink shared channel in the message A.

The user equipment generates the preamble and the uplink shared channel according to the configuration information, and performs transmission on a configured time-frequency resource.

When generating data of the uplink shared channel, the user equipment may scramble bit data, according to information, such as the time-frequency resource for transmitting the random access occasion and/or the time-frequency resource for the uplink shared channel and/or the preamble and/or the demodulation reference signal and the like. The scrambling process is as follows:

For bit data $b(0), \ldots, b(M_{bit}-1)$, $M_{bit}$ representing the number of bits, scrambling data $\tilde{b}(0), \ldots, \tilde{b}(M_{bit}-1)$ is generated before the bit data is modulated, wherein $$\tilde{b}(i)=(b(i)+c(i)) \bmod 2$$

Where the operation mod represents a modulo operation. The sequence $c(i)$, $i=0, \ldots, M_{bit}-1$ is a scrambling sequence, which is a Gold sequence generated as follows.

$$c(i)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

Where parameter $N_c$ is a preset parameter or a parameter configured by the base station, and one possible value of the parameter is $N_c=1600$. $x_1(n)$ and $x_2(n)$ are two m sequences.

The initialization state of the first m sequence $x_1(n)$ is $x_1(0)=1$, $(n)=0$, $n=1, 2, \ldots, 30$. The initialization state of the second m sequence $x_2(n)$ is expressed as $c_{init}=\Sigma_{i=0}^{30} x_2(i)2^i$, with a value determined by the following manner.

$$c_{init}=n_{RNTI}2^{15}+n_{ID}$$

If a data scrambling indication "Data-Scrambling-identifier" for the message A is configured in the system information, the value of $n_{ID}$ is the same as the value of the data scrambling indication. Otherwise, $n_{ID}$ is equal to the cell ID. The data scrambling indication for the message A may be configured and notified in the random access configuration information, or may be configured and notified in the common uplink shared channel configuration or the default bandwidth portion configuration information.

The data scrambling indication parameter $n_{RNTI}$ can be determined by the following manners.

a. The parameter $n_{RNTI}$ is determined according to a time-frequency resource position of the random access occasion of the preamble in the message A.

In this manner, the parameter $n_{RNTI}$ is determined by the time-frequency resource position of the random access occasion. If the message A is sent only on normal uplink (UL) carriers, $n_{RNTI}$ may be calculated by the following equation:

$$n_{RNTI}=y_0+s_{id}+N_s \times t_{id}+N_s \times N_t \times f_{id}$$

Where $y_0$ is the initial value, which has a possible value $y_0=1$; $s_{id}$ is a symbol index of the first symbol of the random access occasion, and its value range is $0 \leq s_{id} < N_s$; $N_s$ is the maximum number of symbols of slots carrying the random access occasion, which has a possible value $N_s=14$; $t_{id}$ is the slot index of the first slot of slots in which the random access occasion is located, and its value range is $0 \leq t_{id} < N_t$, with $N_t$ being the maximum number of slots in the radio frame in which the random access occasion is located and having a possible value $N_t=80$; $f_{id}$ is a frequency domain index of the random access occasion, and its value range is $0 \leq f_{id} < N_f$, with $N_f$ being the maximum number of the random access occasions on the frequency domain and having a possible value $N_f=8$.

If the message A may be sent on multiple uplink carriers, $n_{RNTI}$ may be calculated by the following equation:

$$n_{RNTI}=y_0+s_{id}+N_s \times t_{id}+N_s \times N_t \times f_{id}+N_s \times N_t \times N_f \times UL_{id}$$

Where $UL_{id}$ is an uplink carrier index. One possible example is that there are two uplink carriers in the system for the transmission of the message A, including a normal uplink carrier (NUL) and a supplemental uplink carrier (SUL), then $UL_{id}$ is 0 to indicate NUL and $UL_{id}$ is 1 to indicate SUL.

b. The parameter $n_{RNTI}$ is determined according to a time-frequency resource position for transmitting the uplink shared channel in the message A.

In this manner, the parameter $n_{RNTI}$ is determined by the time-frequency resource position of the uplink shared channel. A possible calculation approach may include:

$$n_{RNTI}=y_0+t_{id}+N_t \times f_{id}$$

Wherein, $y_0$ is the initial value, which has a possible value $y_0=1$; $t_{id}$ is the slot index of the first slot of the uplink shared channel, and its value range is $0 \leq t_{id} < N_t$, that is, $N_t$ is the maximum number of slots in the radio frame; $f_{id}$ is a frequency domain index for transmitting the uplink shared channel in the message A on the frequency domain.

For a case where there are multiple available uplink carriers, the above equation may be modified to:

$$n_{RNTI}=y_0+t_{id}+N_t \times f_{id}+N_t \times N_f \times UL_{id}$$

Where $UL_{id}$ is an uplink carrier index.

This manner is suitable for a case where time domain boundaries of the uplink shared channel are aligned with slot boundaries, that is, a time unit of the uplink shared channel in the message A is a slot.

For a case where the mini-slot is applied as a scheduling unit, the parameter $n_{RNTI}$ may be calculated as follows:

$$n_{RNTI}=y_0+s_{id}+N_s \times t_{id}+N_s \times N_t \times f_{id}$$

Where $s_{id}$ is, in one slot, the first symbol index of the uplink shared channel, and $N_s$ represents the maximum number of symbols available in one slot; in another representation manner, $s_{id}$ is, in one slot, the time domain index of the uplink shared channel, and $N_s$ represents the number of uplink shared channels available in one slot.

For the case where there are multiple available uplink carriers, the above equation may be modified to:

$$n_{RNTI}=y_0+s_{id}+N_s \times t_{id}+N_s \times N_t \times f_{id}+N_s \times N_t \times N_f \times UL_{id}$$

In order to avoid the same scrambling code is applied, by the user equipment occupying the same time-frequency resources for the uplink shared channel, to scramble the data, the port index of the demodulation reference signal may be introduced on the basis of the aforementioned approach.

At this point, the aforementioned first calculation approach for the $n_{RNTI}$ may be corrected to:

$$n_{RNTI}=y_0+t_{id}+N_t \times f_{id}+N_t \times N_f \times n_{DMRS}$$

Where $n_{DMRS}$ is the port index of the demodulation reference signal applied by the uplink shared channel in message A.

For the case where there are multiple available uplink carriers, the first calculation approach for the $n_{RNTI}$ may be corrected to:

$$n_{RNTI}=y_0+t_{id}+N_t \times f_{id}+N_t \times N_f \times n_{DMRS}+N_t \times N_f \times N_{DMRS} \times UL_{id}$$

The aforementioned second calculation approach for the $n_{RNTI}$ may be corrected to:

$$n_{RNTI}=y_0+s_{id}+N_s \times t_{id}+N_s \times N_t \times f_{id}+N_s \times N_t \times N_f \times n_{DMRS}$$

Where $n_{DMRS}$ is the port index of the demodulation reference signal applied by the uplink shared channel in message A.

For the case where there are multiple available uplink carriers, the second calculation approach for the $n_{RNTI}$ may be corrected to:

$$n_{RNTI}=y_0+s_{id}+N_s \times t_{id}+N_s \times N_t \times f_{id}+N_s \times N_t \times N_f \times n_{DMRS}+N_s \times N_t \times N_f \times N_{DMRS} \times UL_{id}$$

c. The parameter $n_{RNTI}$ is determined based on the preamble in the message A.

The parameter $n_{RNTI}$ is determined based on a selected preamble sequence index in the message A. That is, if the preamble sequence index selected by the user equipment is RAPID, $n_{RNTI}$=RAPID.

Considering that the preamble sequence index has a small value range, the calculation approach may be applied in combination with the aforementioned manners.

For example, the parameter $n_{RNTI}$ is calculated by the time-frequency resource position of the random access occasion and the preamble sequence index. Specifically, a parameter $n_{RNTI}'$ is calculated by the aforementioned manner a, and then the parameter $n_{RNTI}$ may be calculated as:

$$n_{RNTI}=n_{RNTI}'+M_{RNTI}' \times RAPID$$

Where $M_{RNTI}'$ is the maximum value of $n_{RNTI}'$.

Alternatively, the parameter $n_{RNTI}$ is calculated by the time-frequency resource position of the uplink shared channel and the preamble sequence index. Specifically, the parameter $n_{RNTI}'$ is calculated by the aforementioned manner b, and then the parameter $n_{RNTI}$ may be calculated as:

$$n_{RNTI}=n_{RNTI}'+M_{RNTI}' \times RAPID$$

Where $M_{RNTI}'$ is the maximum value of $n_{RNTI}'$.

Alternatively, the parameter $n_{RNTI}$ is calculated according to a port index of the demodulation reference signal applied by the uplink shared channel, and the preamble sequence index, which may be described in detail as follows:

$$n_{RNTI}=n_{DMRS}+N_{DMRS} \times RAPID$$

Alternatively, the parameter $n_{RNTI}$ is calculated according to a time-frequency position of the random access occasion and a time-frequency position of the uplink shared channel. Specifically, a parameter $n_{RNTI}^a$ is calculated by the aforementioned manner a, and a parameter $n_{RNTI}^b$ is calculated by the aforementioned manner b, and then the parameter $n_{RNTI}$ may be calculated as:

$$n_{RNTI}=n_{RNTI}^a+M_{RNTI}^a \times n_{RNTI}^b$$

Where $M_{RNTI}^a$ is the maximum value of $n_{RNTI}$.

Alternatively, the parameter $n_{RNTI}$ is calculated according to the time-frequency resource position of the random access occasion and the port index of the demodulation reference signal applied by the uplink shared channel. Specifically, the parameter $n_{RNTI}^a$, is calculated by the aforementioned manner a, and then the parameter $n_{RNTI}$ may be calculated as:

$$n_{RNTI}=n_{RNTI}^a+M_{RNTI}^a \times n_{DMRS}$$

Where $M_{RNTI}^a$ is the maximum value of $n_{RNTI}^a$.

In addition to scrambling the data to be transmitted using the scrambling code, the scrambling may be replaced with bit-level interleaving. By defining a plurality of bit-level interleaving patterns, and defining associations between the random access preamble sequence index and the interleaving patterns, the user equipment acquires the corresponding interleaving pattern by selecting the preamble, and performs bit-level scrambling on the bit data to be transmitted; the base station acquires the bit-level interleaving pattern applied by the uplink shared channel by detecting the preamble, and performs data detection. The bit-level interleaving pattern configuration and the association between the interleaving pattern and the preamble sequence index are all configured and notified in the system information.

Hereinafter, the random access method will be introduced in combination with the power control.

In this embodiment, the user equipment acquires the random access configuration information in the system information, including the configuration information of the preamble applied by the message A, and the configuration information of the uplink shared channel in the message A.

The user equipment generates the preamble and the uplink shared channel according to the configuration information, and determines the transmitted power of the preamble and the uplink shared channel according to the power control parameter in the aforementioned configuration information, and performs transmission on the configured time-frequency resource. For example, the user equipment may determine the transmitted power of the uplink shared channel in the first message according to a sum of the power rampups of the single physical resource block.

The user equipment determines the transmitted power of the uplink shared channel in the message A according to the following manner:

$$P_{PUSCH} = \min\begin{Bmatrix} P_{CMAX} \\ P_{O\_PUSCH} + 10\log_{10}(2^\mu M_{RB}^{MSGA}) + \alpha PL \end{Bmatrix} [dBm]$$

Where parameter $P_{CMAX}$ is the configured transmitted power of the user equipment, i.e., the maximum transmitted power of the user equipment.

The parameter $P_{O\_PUSCH}$ is calculated as follows:

$$P_{O\_PUSCH} = P_{O\_PRE} + \Delta P_{rampup} + \Delta_{PREAMBLE\_MSG3}$$

Where $P_{O\_PRE}$ is a preamble initial received target power, preamble InitialReceivedTargetPower, configured by a high layer, $\Delta P_{rampup}$ is a sum of the power rampups calculated from the first attempt for transmitting first message to the current attempt for transmitting first message, and $\Delta_{PREAMBLE\_MSG3}$ is parameter Delta-preamble-msg3 configured by a high layer, to characterize power difference between the preamble and the message 3, and it is applied to characterize the power difference between the preamble in the message A and the uplink shared channel in the message A when the message A is transmitted. The parameter Delta-preamble-msg3 is configured and notified in the system information.

In another approach, a parameter $P_{O\_PUSCH}$ is calculated as follows:

$$P_{O\_PUSCH} = P_{O\_PRE} + \Delta P_{rampup} + \Delta_{PREAMBLE\_MSGA}$$

Where the meanings of $P_{O\_PRE}$ and $\Delta P_{rampup}$ are the same meaning as the aforementioned ones. $\Delta_{PREAMBLE\_MSGA}$ A parameter is configured by a high layer to characterize the power difference between the preamble in the message A and the uplink shared channel in the message A. This parameter can be configured and notified in the system information. For example, the parameter is added in the random access configuration information to configure the power difference between the preamble in the message A and the uplink shared channel in the message A; alternatively, the parameter is configured in the common uplink shared channel configuration or configured and notified in the default bandwidth portion configuration information, to configure the power difference between the preamble in the message A and the uplink shared channel in the message A.

Parameter $M_{RB}^{MSGA}$ is the number of physical resource blocks occupied by the uplink shared channel bandwidth in the message A. Parameter μ is a parameter for configuring the subcarrier spacing of the uplink shared channel in the message A, and is configured and notified through the system information.

Parameter PL is the path loss calculated by the user equipment according to the RSRP and the transmitted power of the base station which is configured by a high layer signaling. Parameter α is the power control parameter configured by the high layer signaling or set in advance.

In some possible cases, if, after transmitting the message A, the user equipment detects the random access response matching the preamble in the message A within a detection window after a pre-configured or predefined time, the user equipment transmits the message 3 on the responded time-frequency resource according to an uplink grant command contained in the random access response.

The transmitted power of the message 3 may be determined in the following manner.

The transmitted power $P_{PUSCH}$ of the message 3 is calculated as:

$$P_{PUSCH} = \min\begin{Bmatrix} P_{CMAX} \\ P_{O\_PUSCH} + 10\log_{10}(2^\mu M_{RB}^{MSG3}) + \alpha PL + f(i) \end{Bmatrix} [dBm]$$

Where parameter $P_{CMAX}$ is the configured transmitted power of the user equipment, i.e., the maximum transmitted power of the user equipment.

The parameter $P_{O\_PUSCH}$ is calculated as follows:

$$P_{O\_PUSCH} = P_{O\_PRE} + \Delta_{PREAMBLE\_MSG3}$$

Where $P_{O\_PRE}$ is the preamble Initial Received Target Power, preamble InitialReceivedTargetPower, configured by the high layer, and $\Delta_{PREAMBLE\_MSG3}$ is the parameter Delta-preamble-msg3 configured by the high layer, to characterize the power difference between the preamble and the message 3.

Parameter $M_{RB}^{MSG3}$ is the number of physical resource blocks occupied by the uplink shared channel bandwidth in the message 3. Parameter μ is a parameter for configuring the subcarrier spacing of the uplink shared channel in the message 3, and is configured and notified through the system information.

Parameter PL is the path loss calculated by the user equipment according to the RSRP and the transmitted power of the base station which is configured by a high layer signaling. Parameter α is the power control parameter configured by the high layer signaling or set in advance.

Parameter f(i) is cumulative power control parameter of the ith transmission period, and the calculation approach for the parameter is as follows:

$$f(i) = f(i-1) + \delta_{PUSCH}(i - K_{PUSCK})$$

Where $\delta_{PUSCH}(i - K_{PUSCK})$ is the power control parameter configured by the base station in the downlink control channel within a transmission period before $K_{PUSCK}$. And $$f(0) = \Delta P_{rampup} \delta_{msg2}$$

Where $\Delta P_{rampup}$ is a sum of the power rampups calculated from the first attempt for transmitting first message to the current attempt for transmitting first message, and $\delta_{msg2}$ is the power control parameter in the uplink grant command contained in the random access response.

Figure 10:
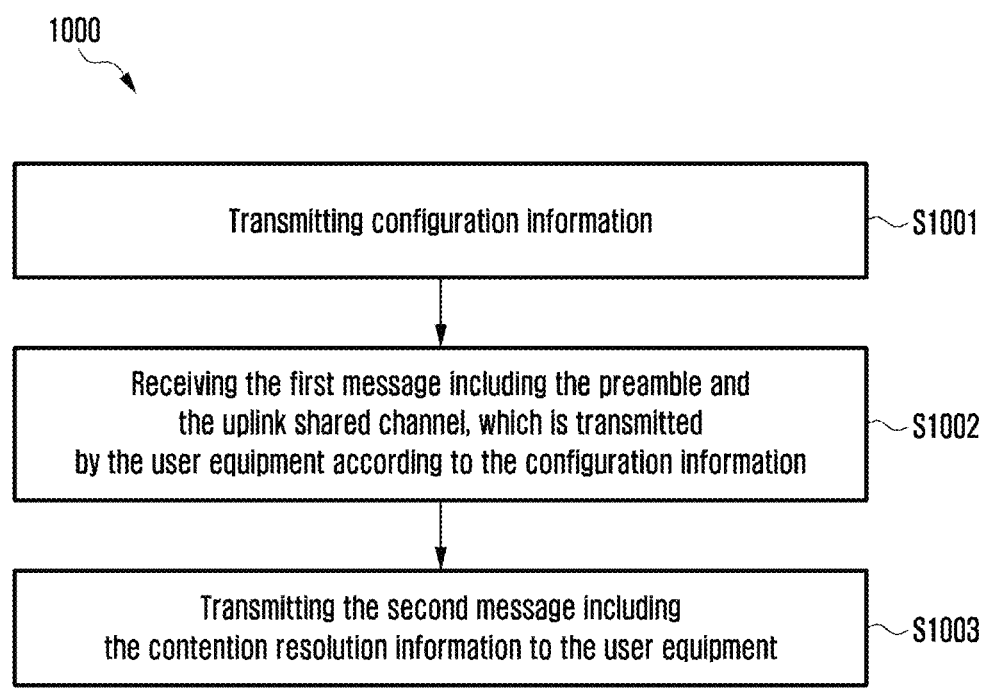
FIG. 10 schematically illustrates a schematic diagram of a random access method according to an embodiment of the present disclosure.

FIG. 10 schematically illustrates a schematic diagram of a random access method according to an embodiment of the present disclosure.

The random access method is performed on the base station side. The random access method includes: in step S1001, transmitting the configuration information; in step S1002, receiving the first message including the preamble and the uplink shared channel, which is transmitted by the user equipment according to the configuration information; and in step S1003, transmitting the second message including the contention resolution information to the user equipment.

The configuration information may be configuration information in the system information transmitted by the base station to the user equipment, and the channel structure for transmitting the message A may be acquired according to the configuration information, wherein the channel structure includes the preamble, the uplink shared channel, and the guard time.

In an embodiment, the base station may configure, in the configuration information, the number of time units and/or the time unit index of the uplink shared channel, configure the number of slots of the uplink shared channel and the number of symbols in the last slot, or configure the number of slots of the uplink shared channel and the number of symbols of the uplink shared channel.

The base station may also configure the repetition factor for the uplink shared channel.

The user equipment may configure the frequency domain resource for the random access occasion occupied by the preamble and the frequency domain resource occupied by the uplink shared channel, and configure the guard band reserved between neighboring frequency domain resources for the uplink shared channel.

Configuring the reserved guard band may comprises: configuring the frequency domain resource for the random access occasion, the starting index for frequency domain physical resource block of the uplink shared channel corresponding to the random access occasion, and the bandwidth identified by the number of physical resource blocks. Configuring the reserved guard band may further comprise: configuring the first physical resource block index of the first uplink shared channel, the uplink shared channel bandwidth identified by the number of physical resource blocks, and the number of guard bands.

The field or optional field indicating the waveform configuration may also be configured in the configuration information; or the field or optional field indicating whether the transform precoding is enabled or not may also be configured in the configuration information.

The base station may also configure, in the configuration information, a parameter for characterizing the power difference between the preamble and the message 3 and a parameter for characterizing the power difference between the preamble in the first message and the uplink shared channel in the first message.

The configuration information may include the random access configuration information, the common uplink shared channel configuration information, or the default bandwidth portion configuration information.

In the context, the features included in the embodiment method suitable for the user equipment side may also be appropriately used for the embodiment method and apparatus on the base station side to avoid duplication as appropriate.

Figure 11:
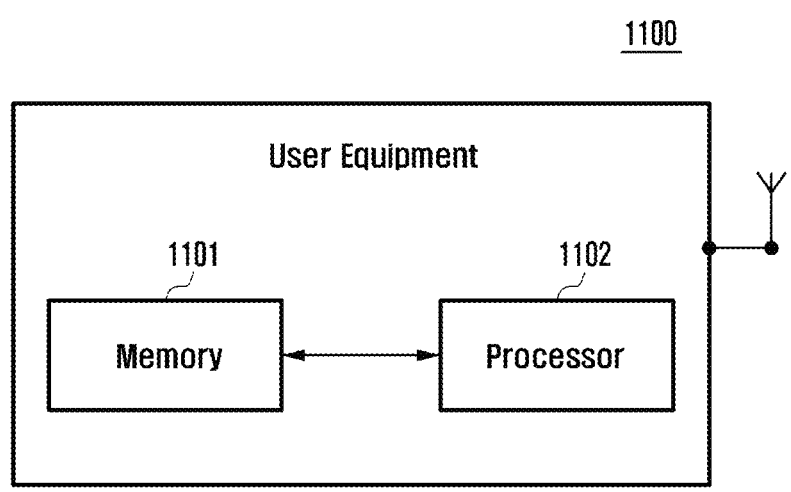
FIG. 11 schematically illustrates a schematic diagram of a user equipment according to an embodiment of the present disclosure.

FIG. 11 schematically illustrates a schematic diagram of a user equipment 1100 according to an embodiment of the present disclosure.

The user equipment 1100 includes a processor 1102 and a memory 1101 that stores computer executable code that, when executed by the processor, performs the random access method on the user equipment side as described above.

Figure 12:
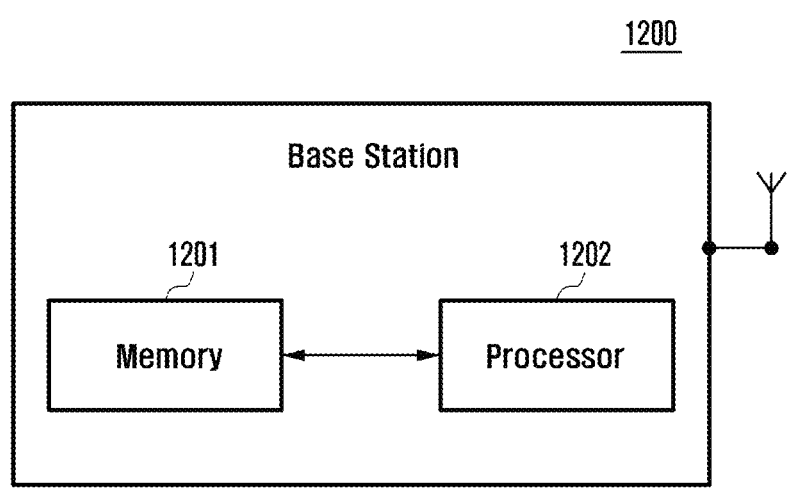
FIG. 12 schematically illustrates a schematic diagram of a base station according to an embodiment of the present disclosure.

FIG. 12 schematically illustrates a schematic diagram of a base station 1200 according to an embodiment of the present disclosure.

The base station device 1200 includes a processor 1202 and a memory 1201 that stores computer executable code that, when executed by the processor, performs the random access method on the base station side as described above.

The present disclosure further provides a computer readable medium storing instructions, when executed by the processor, performing the random access method on the user equipment side or the base station side according to the aforementioned embodiments of the present disclosure.

The "memory" herein may be of any type suitable for the technical environment herein, and may be implemented using any suitable data storage technology, including but not limited to semiconductor-based memory devices, magnetic memory devices and systems, optical memory devices and systems, fixed memories and removable memories.

The processor herein may be of any type suitable for the technical environment herein, including but not limited to one or more of the following: a general purpose computer, a special purpose computer, a microprocessor, a digital signal processor DSP, and a multi-core processor architecture based processor.

"Computer-readable medium" herein should be considered to include any medium or combination of a plurality of mediums capable of storing instructions executed by a computer, or a device capable of storing instructions and data temporarily or permanently, and may include, but is not limited to, random storage Memory (RAM), read only memory (ROM), buffer memory, flash memory, optical media, magnetic media, cache memory, other types of memory (e.g., erasable programmable read only memory (EEPROM)), and/or any suitable combination thereof. "Computer-readable medium" may refer to a single storage or memory device and/or a "cloud-based" storage system or storage network that includes a plurality of storages or memory devices.

The terminology used herein is for the purpose of describing the particular embodiments, and not intended to limit the disclosure. In addition, the terms "including", "comprising", etc., are used to indicate the presence of the described features, steps, operations and/or components, but do not exclude the presence or addition of one or more other features, steps, operations or components.

Each block in the flowchart or block diagram in the embodiments of the present disclosure may represent a hardware module, a program segment, or a portion of code, and the above-described module, program segment, or a portion of code may include one or more executable instructions for implementing specified logical functions. It should also be noted that, in some alternative implementations, the functions noted in the flowcharts and blocks may also occur in a different order than those illustrated in the drawings. For example, two successively represented blocks may actually be executed substantially in parallel, and they may sometimes be executed in the reverse order, depending on the functions involved. It is also noted that each block of the block diagrams or flowcharts, and combinations of blocks in the block diagrams or flowcharts, can be implemented by a dedicated hardware-based system that performs a specified function or operation, or may be implemented by a combination of a dedicated hardware and computer instructions.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
    receiving, from a base station, system information including a configuration for a message A (MsgA) of a two-step random access procedure, the MsgA including physical random access channel (PRACH) and a physical uplink shared channel (PUSCH) in the two-step random access procedure;
    transmitting, to the base station, the PRACH and the PUSCH based on the configuration; and receiving, from the base station, a response for the PRACH and the PUSCH, wherein whether to apply a transform precoding for the PUSCH of the Msg A is determined based on the configuration for the MsgA, in case that the configuration for the MsgA including information indicating whether to apply the transform precoding for the PUSCH of the MsgA, and wherein whether to apply a transform precoding for the PUSCH of the Msg A is determined based on the configuration for a message 3(Msg3) of a four-step random access, in case that the configuration for the MsgA does not include the information indicating whether to apply the transform precoding for the PUSCH of the MsgA.

2. The method of claim 1, wherein the PUSCH is transmitted based on subcarrier spacing associated with an uplink bandwidth part configured by the system information.

3. The method of claim 2, wherein the uplink bandwidth part is an initial uplink bandwidth part.

4. The method of claim 1, wherein the PRACH is transmitted based on a power offset for the two-step random access procedure configured by the system information.

5. A terminal in a communication system, the terminal comprising:
a transceiver, and
a controller configured to:
receive, from a base station, system information including a configuration for a message A (MsgA) of a two-step random access procedure, the MsgA including physical random access channel (PRACH) and a physical uplink shared channel (PUSCH) in the two-step random access procedure;
transmit, to the base station, the PRACH and the PUSCH based on the configuration; and
receive, from the base station, a response for the PRACH and the PUSCH,
wherein whether to apply a transform precoding for the PUSCH of the Msg A is determined based on the configuration for the MsgA, in case that the configuration for the MsgA including information indicating whether to apply the transform precoding for the PUSCH of the MsgA, and
wherein whether to apply a transform precoding for the PUSCH of the Msg A is determined based on the configuration for a message 3(Msg3) of a four-step random access, in case that the configuration for the MsgA does not include the information indicating whether to apply the transform precoding for the PUSCH of the MsgA.

6. The terminal of claim 5, wherein the PUSCH is transmitted based on subcarrier spacing associated with an uplink bandwidth part configured by the system information.

7. The terminal of claim 6, wherein the uplink bandwidth part is an initial uplink bandwidth part.

8. The terminal of claim 5, wherein the PRACH is transmitted based on a power offset for the two-step random access procedure configured by the system information.

9. A method performed by a base station in a communication system, the method comprising:
transmitting, to a terminal, system information including a configuration for a message A (MsgA) of a two-step random access procedure, the MsgA including physical random access channel (PRACH) and a physical uplink shared channel (PUSCH) in the two-step random access procedure;
receiving, from the terminal, the PRACH and the PUSCH based on the configuration; and
transmitting, to the terminal, a response for the PRACH and the PUSCH,
wherein whether to apply a transform precoding for the PUSCH of the Msg A is determined based on the configuration for the MsgA, in case that the configuration for the MsgA including information indicating whether to apply the transform precoding for the PUSCH of the MsgA, and
wherein whether to apply a transform precoding for the PUSCH of the Msg A is determined based on the configuration for a message 3(Msg3) of a four-step random access, in case that the configuration for the MsgA does not include the information indicating whether to apply the transform precoding for the PUSCH of the MsgA.

10. The method of claim 9, wherein the PUSCH is received based on subcarrier spacing associated with an uplink bandwidth part configured by the system information.

11. The method of claim 10, wherein the uplink bandwidth part is an initial uplink bandwidth part.

12. The method of claim 9, wherein the PRACH is received based on a power offset for the two-step random access procedure configured by the system information.

13. A base station in a communication system, the base station comprising:
transmitting, to a terminal, system information including a configuration for a message A (MsgA) of a two-step random access procedure, the MsgA including physical random access channel (PRACH) and a physical uplink shared channel (PUSCH) in the two-step random access procedure;
receiving, from the terminal, the PRACH and the PUSCH based on the configuration; and
transmitting, to the terminal, a response for the PRACH and the PUSCH,
wherein whether to apply a transform precoding for the PUSCH of the Msg A is determined based on the configuration for the MsgA, in case that the configuration for the MsgA including information indicating whether to apply the transform precoding for the PUSCH of the MsgA, and
wherein whether to apply a transform precoding for the PUSCH of the Msg A is determined based on the configuration for a message 3(Msg3) of a four-step random access, in case that the configuration for the MsgA does not include the information indicating whether to apply the transform precoding for the PUSCH of the MsgA.

14. The base station of claim 13, wherein the PUSCH is received based on subcarrier spacing associated with an uplink bandwidth part configured by the system information, and
wherein the uplink bandwidth part is an initial uplink bandwidth part.

15. The base station of claim 13, wherein the PRACH is received based on a power offset for the two-step random access procedure configured by the system information.

* * * * *